United States Patent
Bartell et al.

(10) Patent No.: US 7,457,234 B1
(45) Date of Patent: Nov. 25, 2008

(54) SYSTEM AND METHOD FOR PROTECTING COMMUNICATION BETWEEN A CENTRAL OFFICE AND A REMOTE PREMISES

(75) Inventors: John B. Bartell, Madison, AL (US); Dean D. Bekken, II, Madison, AL (US); Mark J. Ogden, Owens Cross Roads, AL (US)

(73) Assignee: Adtran, Inc., Huntsville, AL (US)

( * ) Notice: Subject to any disclaimer, the term of this patent is extended or adjusted under 35 U.S.C. 154(b) by 1011 days.

(21) Appl. No.: 10/790,158

(22) Filed: Mar. 1, 2004

Related U.S. Application Data

(60) Provisional application No. 60/475,849, filed on Jun. 3, 2003, provisional application No. 60/470,374, filed on May 14, 2003.

(51) Int. Cl.
*H04J 1/16* (2006.01)
*H04J 3/14* (2006.01)

(52) U.S. Cl. ................................. 370/216; 370/218
(58) Field of Classification Search ................. 370/216, 370/217, 218, 219, 220, 225, 227, 228
See application file for complete search history.

(56) References Cited

U.S. PATENT DOCUMENTS

| | | | |
|---|---|---|---|
| 4,594,704 A | 6/1986 | Ollivier | |
| 4,679,189 A | 7/1987 | Olson et al. | |
| 4,700,348 A | 10/1987 | Ise et al. | |
| 4,720,780 A | 1/1988 | Dolecek | |
| 4,984,240 A | 1/1991 | Keren-Zvi et al. | |
| 5,016,244 A | 5/1991 | Massey, Jr. et al. | |
| 5,084,816 A | 1/1992 | Boese et al. | |
| 5,161,192 A | 11/1992 | Carter et al. | |
| 5,175,639 A * | 12/1992 | Takasaki | 398/67 |
| 5,226,120 A | 7/1993 | Brown et al. | |
| 5,261,044 A | 11/1993 | Dev et al. | |
| 5,274,782 A | 12/1993 | Chalasani et al. | |
| 5,276,861 A | 1/1994 | Howarth | |
| 5,287,491 A | 2/1994 | Hsu | |
| 5,301,303 A | 4/1994 | Abraham et al. | |
| 5,313,456 A * | 5/1994 | Sugawara | 370/228 |
| 5,341,496 A | 8/1994 | Middledary et al. | |
| 5,345,438 A | 9/1994 | Ozaki | |
| 5,367,521 A | 11/1994 | Sanchez et al. | |
| 5,434,691 A * | 7/1995 | Yamane | 398/5 |

(Continued)

*Primary Examiner*—Ajit Patel
(74) *Attorney, Agent, or Firm*—Thomas, Kayden, Horstemeyer & Risley, L.L.P.

(57) ABSTRACT

A data communication system for communicating between a central office and a remote premises comprises a first transceiver, a second transceiver, and control logic. The first transceiver is coupled to a first communication connection extending from the central office to the remote premises and is configured to communicate with a central office transceiver. The second transceiver is coupled to a second communication connection extending from the central office to the remote premises. The control logic resides at the remote premises and is configured to detect an error condition associated with communication between the first transceiver and the transceiver located at the central office. The control logic is configured to transmit, in response to a detection of the error condition, a switch notification to the central office via the second transceiver and the second communication connection, wherein at least one component at the central office is configured to route data over the second communication connection in response to the switch notification.

21 Claims, 6 Drawing Sheets

U.S. PATENT DOCUMENTS

| | | |
|---|---|---|
| 5,485,576 A | 1/1996 | Fee et al. |
| 5,546,282 A | 8/1996 | Hill et al. |
| 5,602,828 A | 2/1997 | Engdahl et al. |
| 5,790,518 A | 8/1998 | Nguyen et al. |
| 2001/0043568 A1* | 11/2001 | McHale et al. .............. 370/254 |
| 2002/0105966 A1* | 8/2002 | Patel .......................... 370/463 |
| 2004/0076161 A1* | 4/2004 | Lavian et al. .......... 370/395.41 |
| 2006/0126500 A1* | 6/2006 | Wakai et al. ................ 370/218 |
| 2006/0177175 A1* | 8/2006 | Mayer et al. ................... 385/24 |
| 2006/0203719 A1* | 9/2006 | Kim et al. ................... 370/227 |

* cited by examiner

SYSTEM AND METHOD FOR PROTECTING COMMUNICATION BETWEEN A CENTRAL OFFICE AND A REMOTE PREMISES

CROSS REFERENCE TO RELATED APPLICATIONS

This application claims priority to U.S. Provisional Application No. 60/470,374, entitled "1×N Protection System and Method," and filed on May 14, 2003, which is incorporated herein by reference. This application also claims priority to U.S. Provisional Application No. 60/475,849, entitled "System and Method for Protecting Communication Between a Central Office and a Remote Premises," and filed on Jun. 3, 2003, which is incorporated herein by reference.

RELATED ART

In current telecommunication environments, data is often communicated between transceivers at a central office and transceivers at one or more remote premises, referred to as a "customer premises," via one or more communication connections, referred to as "subscriber lines." When a plurality of transceivers are implemented at a single location, each transceiver is normally positioned within a different slot of one or more chassises.

As known in the art, a chassis is a structure for holding or housing transceivers, as well as circuits for performing various control and communication functionality associated with the transceivers mounted in the chassis. The transceivers and circuits are typically implemented on printed circuit boards (PCBs) and are sometimes referred to as "cards." Each chassis has a backplane that provides connectivity between the transceivers and circuits residing in the chassis and, in particular, allows a control card within the chassis to communicate with and control the other transceivers and circuits residing within the same chassis.

Moreover, when a customer orders telecommunication services from a network service provider, the network service provider normally mounts, in a single chassis, a number of transceivers dedicated for servicing the customer depending on the type of service ordered by the customer. In this regard, the network service provider may mount, in the chassis, one transceiver for each subscriber line that is to extend from the central office to the customer premises. One of the transceivers, referred to as the "spare transceiver," terminating one of the subscriber lines, referred to as the "backup subscriber line," is used to backup communication occurring across the other subscriber lines dedicated to the same customer.

In this regard, the chassis is normally hardwired such that the spare transceiver is able to monitor the communication occurring across each of the other subscriber lines. If the spare transceiver detects an error condition (e.g., a communication failure) associated with one of the subscriber lines, the spare transceiver commandeers the data communication that is occurring across the failed subscriber line. In this regard, the spare transceiver notifies the customer premises transceiver that is communicating across the failed subscriber line and instructs this transceiver to communicate across the backup subscriber line in lieu of the failed subscriber line. Communication between this transceiver and the spare transceiver then commences once the switchover is successfully effectuated. In this way, the spare transceiver and the backup subscriber line effectively backup each of the other subscriber lines and central office transceivers that are dedicated to the same customer premises.

The aforedescribed backup scheme is sometimes referred to as a "1×n" protection scheme where the value "1" is indicative of the number of spare transceivers employed within the scheme and where "n" is indicative of the number of transceivers protected by the protection scheme. As an example, if one spare transceiver is used to backup three central office transceivers dedicated to the same customer premises, then the protection scheme may be referred to as a "1×3" protection scheme.

As more customers order new services, more transceivers are inserted into the slots of the aforementioned chassis. At some point, all of the slots of the chassis become occupied such that there are no more additional slots for accommodating a new transceiver. However, one of the customers serviced by one or more of the transceivers in the chassis may request an additional subscriber line requiring termination via a new transceiver. When this occurs, the network service provider may be faced with a decision of either reconfiguring the chassis or the transceivers in the chassis to accommodate the customer request or of inserting the new transceiver in a different chassis.

Reconfiguring the chassis or the transceivers in the chassis can be burdensome and time consuming. Furthermore, the spare transceiver is normally able to only backup transceivers within the same chassis as the spare transceiver. Thus, inserting the new transceiver into a different chassis has the drawback of being unable to use the same spare transceiver to backup the communication handled by the new transceiver. In such a case, the network service provider may choose to not backup the new transceiver or may implement yet another spare transceiver and backup subscriber line for protecting the new transceiver.

For at least the foregoing reasons, the network service provider is sometimes faced with undesirable alternatives when adding a new transceiver to service an existing customer.

SUMMARY

Embodiments of the present invention generally pertain to systems and methods for protecting communication between a central office and a remote premises.

A system in accordance with one exemplary embodiment of the present invention comprises a first transceiver, a second transceiver, and control logic. The first transceiver is coupled to a first communication connection extending from the central office to the remote premises and is configured to communicate with a central office transceiver. The second transceiver is coupled to a second communication connection extending from the central office to the remote premises. The control logic resides at the remote premises and is configured to detect an error condition associated with communication between the first transceiver and the transceiver located at the central office. The control logic is configured to transmit, in response to a detection of the error condition, a switch notification to the central office via the second transceiver and the second communication connection, wherein at least one component at the central office is configured to route data over the second communication connection in response to the switch notification.

A method in accordance with an exemplary embodiment of the present invention comprises the steps of: communicating between a first remote transceiver and a first central office transceiver via a first communication connection extending from the central office to the remote premises; detecting an error condition associated with the communicating step; transmitting, in response to said error condition, a switch notification from a second remote transceiver to a second central office transceiver via a second communication connection extending from the central office to the remote premises; and performing a backup switch in response to the switch notification such that a communication device previously communicating over said first communication connection switches to communicating over said second communication connection.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION

The present invention generally relates to techniques for protecting communication occurring within a networked communication system. In one exemplary embodiment of the present invention, control logic at a customer premises monitors communication occurring across at least one subscriber line terminated at the customer premises. If communication across one such subscriber line fails or otherwise becomes significantly degraded, the control logic initiates a subscriber line switch such that the communication is switched to a backup subscriber line. In this regard, the control logic switches, to the backup subscriber line, a communication device (e.g., telephone, modem, etc.) previously communicating with the central office via the degraded subscriber line and notifies a spare transceiver at the central office of the switch via the backup subscriber line. The spare transceiver then switches, at the central office, the communication from the degraded subscriber line to the backup subscriber line. Thereafter, communication that would have occurred over the degraded subscriber line occurs over the backup subscriber line via the spare transceiver.

Figure 1:
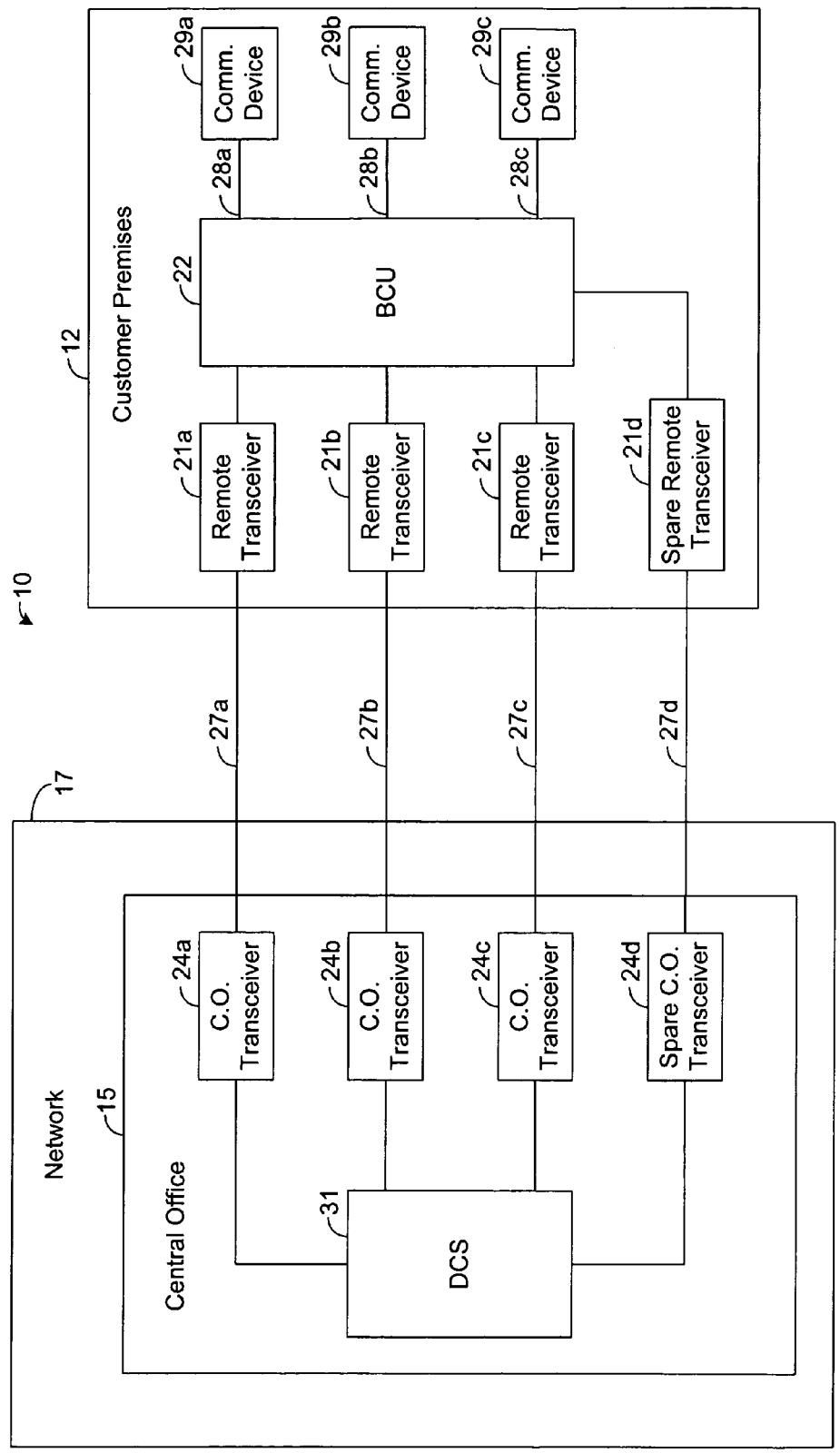
FIG. 1 is a block diagram illustrating an exemplary communication system in accordance with one embodiment of the present invention.

FIG. 1 depicts a communication system 10 in accordance with one exemplary embodiment of the present invention. As shown by FIG. 1, the system 10 comprises a customer premises 12 that is remotely located from a central office 15 of a network 17, such as a wide area network (WAN), for example. The customer premises 12 comprises a plurality of transceivers 21a-21c, referred to as "remote transceivers," and a backup control unit (BCU) 22. The remote transceivers 21a-21c communicate with a plurality of central office transceivers 24a-24c and a plurality of subscriber lines 27a-27c, referred to as "primary subscriber lines." In this regard, data received from the primary subscriber lines 27a-27c is transmitted through the BCU 22 to at least one communication device 29a-29c, such as a telephone, a modem, a facsimile machine, etc. Further, data transmitted from the communication devices 29a-29c passes through the BCU 22 and is transmitted to the central office 15 via one of the primary subscriber lines 27a-27c. Note any number of communication devices 29a-29c may be implemented at the customer premises 12.

Each remote transceiver 21a-21c terminates and communicates over a respective one of the primary subscriber lines 27a-27c. When high speed communication techniques, such as high-data-rate digital subscriber line (HDSL) techniques, for example, are employed to communicate over primary subscriber lines 27a-27c, each of the remote transceivers 21a-21c may comprise a DS1 unit for terminating and communicating over a respective one of the subscriber lines 27a-27c. In such an embodiment, the central office transceivers 24a-24c may similarly comprise DS1 units. However, it should be noted that other types and numbers of transceivers 21a-21c and 24a-24c, as well as other numbers of subscriber lines 27a-27c, may be employed depending on the type of communication that is occur between the central office 15 and the customer premises 12.

As shown by FIG. 1, the central office 17 comprises a digital crossconnect system (DCS) 31 or some other component for routing data, as will be described in more detail below. Data destined for the remote transceivers 21a-21c, and ultimately at least one of the communication devices 29a-29c, is routed to the DCS 31 from other components (not shown for simplicity) in the network 17. The DCS 31 maps this data to the appropriate central office transceiver 24a-24c such that the data is received by the appropriate remote transceiver 21a-21c. For example, if central office transceiver 24a and remote transceiver 21a both terminate primary subscriber line 27a, then the DCS 31, except as otherwise described herein, transmits all data received by the DCS 31 and destined for the remote transceiver 21a to central office transceiver 24a. Thus, all such data is eventually received by the remote transceiver 24a over subscriber line 27a.

The central office 15 also comprises a spare transceiver 24d that terminates a backup subscriber line 27d. Initially, it is not necessary for the backup subscriber line 27 to be terminated at the customer premises as it is not initially used for communication between the central office 15 and the customer premises 12. However, as will be described in more detail hereafter, communication from any one of the primary subscriber lines 27a-27c may be switched to the backup subscriber line 27d in response to a detection of a communication failure or error occurring along any one of the primary subscriber lines 27a-27c. Prior to such a switch, it is desirable to ensure that the backup subscriber line 27d is terminated by a spare remote transceiver 21d at the customer premises 12.

Figure 2:
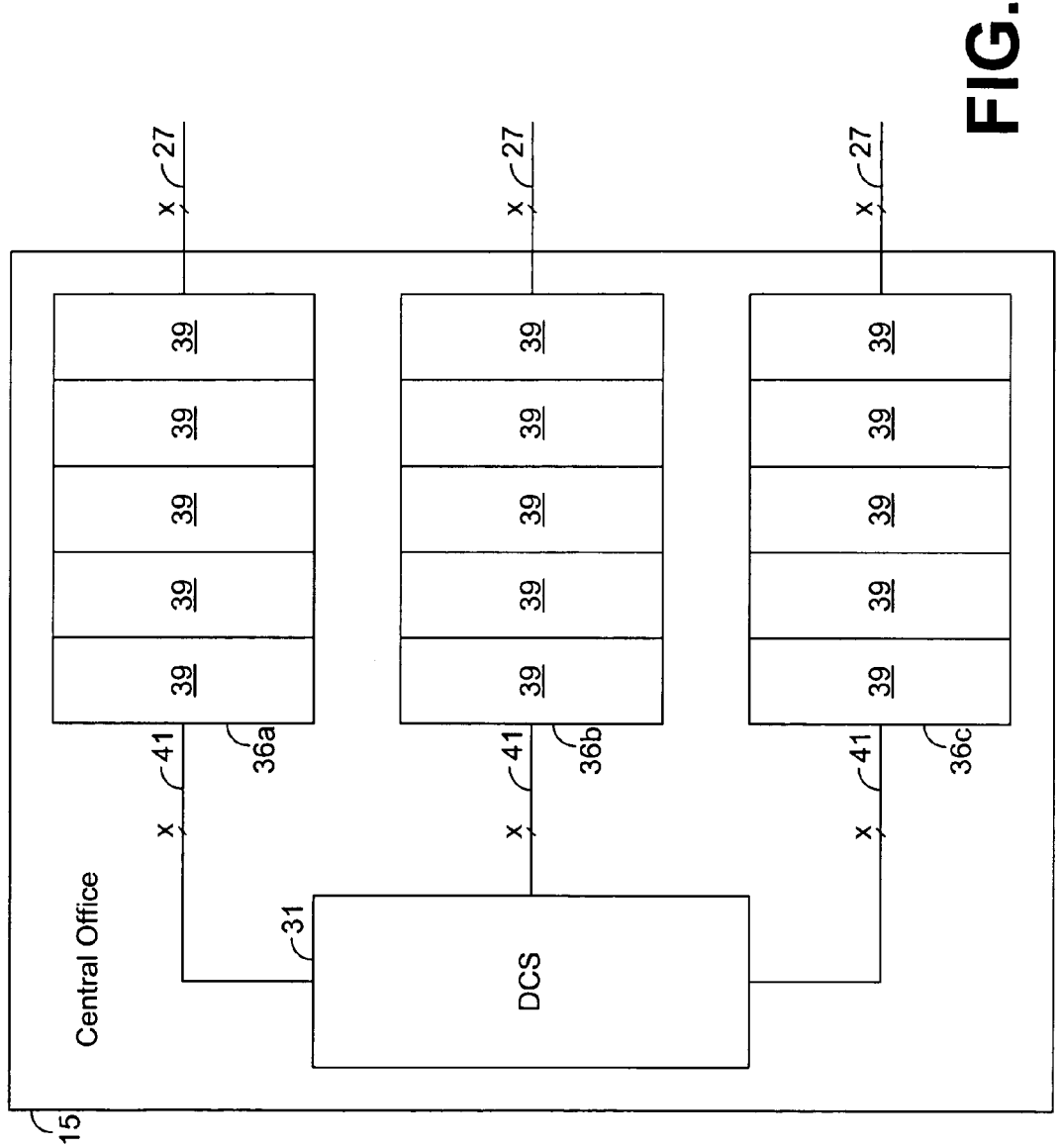
FIG. 2 is a block diagram illustrating a central office depicted in FIG. 1 before transceivers are mounted within chassises residing at the central office.

FIG. 2 depicts a more detailed view of the central office 17 prior to the installation of any transceivers 24a-24d at the central office 17. As shown by FIG. 2, the central office 15 comprises a plurality of chassises 36a-36c. Each chassis 36a-36c has slots 39 for receiving and holding transceivers, such as, for example, one of the central office transceivers 24a-24d depicted by FIG. 1. The design and configuration of the chassises 36a-36c may be identical to that of conventional chassises currently employed within existing networks.

As shown by FIG. 2, each chassis 36a-36c is communicatively coupled to the DCS 31 via "x" number of conductive connections 41, where "x" refers to the number of slots 39 in the chassis 36a-36c. For example, if a chassis 36a-36c comprises twenty-eight (28) slots 39, then there may be twenty eight (28) connections 41 extending between the DCS 31 and the chassis 36a. When a transceiver is inserted into a slot 39, a conductive connection is made between such transceiver and one of the connections 41 such that the DCS 31 and the transceiver are able to communicate.

Note that other techniques may be employed for connecting the DCS 31 to the chassises 36a-36c and the transceivers within the chassises 36a-36c. For example, one or more of the chassises 36a-36c may comprise multiplexer/demultiplexer (MUX/DEMUX) to multiplex data onto and demultiplex data from a high speed link, such as a DS3 link, for example, between the DCS 31 and the chassis 36a-36c. Various other techniques for interconnecting the DCS 31 and the chassises 36a-36c and of communicating therebetween are possible in other embodiments.

In addition, each chassis 36a-36c is also communicatively coupled to an "x" number of subscriber lines 27. When a transceiver is inserted into a slot 39, a conductive connection is made between such transceiver and one of the subscriber lines 27 such that the transceiver is able to communicate with a remote transceiver terminating the other end of the one subscriber line 27. Therefore, after being inserted into a slot 39, a transceiver may communicate with the DCS 31 and a remote transceiver located at a customer premises, such as the premises 12 depicted by FIG. 1, for example. Note that the subscriber lines 27 depicted by FIG. 2 include the subscriber lines 27a-27d depicted by FIG. 1 plus other subscriber lines that extend to other customer premises (not shown). In addition, it should also be noted that, while FIG. 2 depicts three chassises 36a-36c, other numbers of chassises may be employed at the central office 15 in other embodiments.

Figure 3:
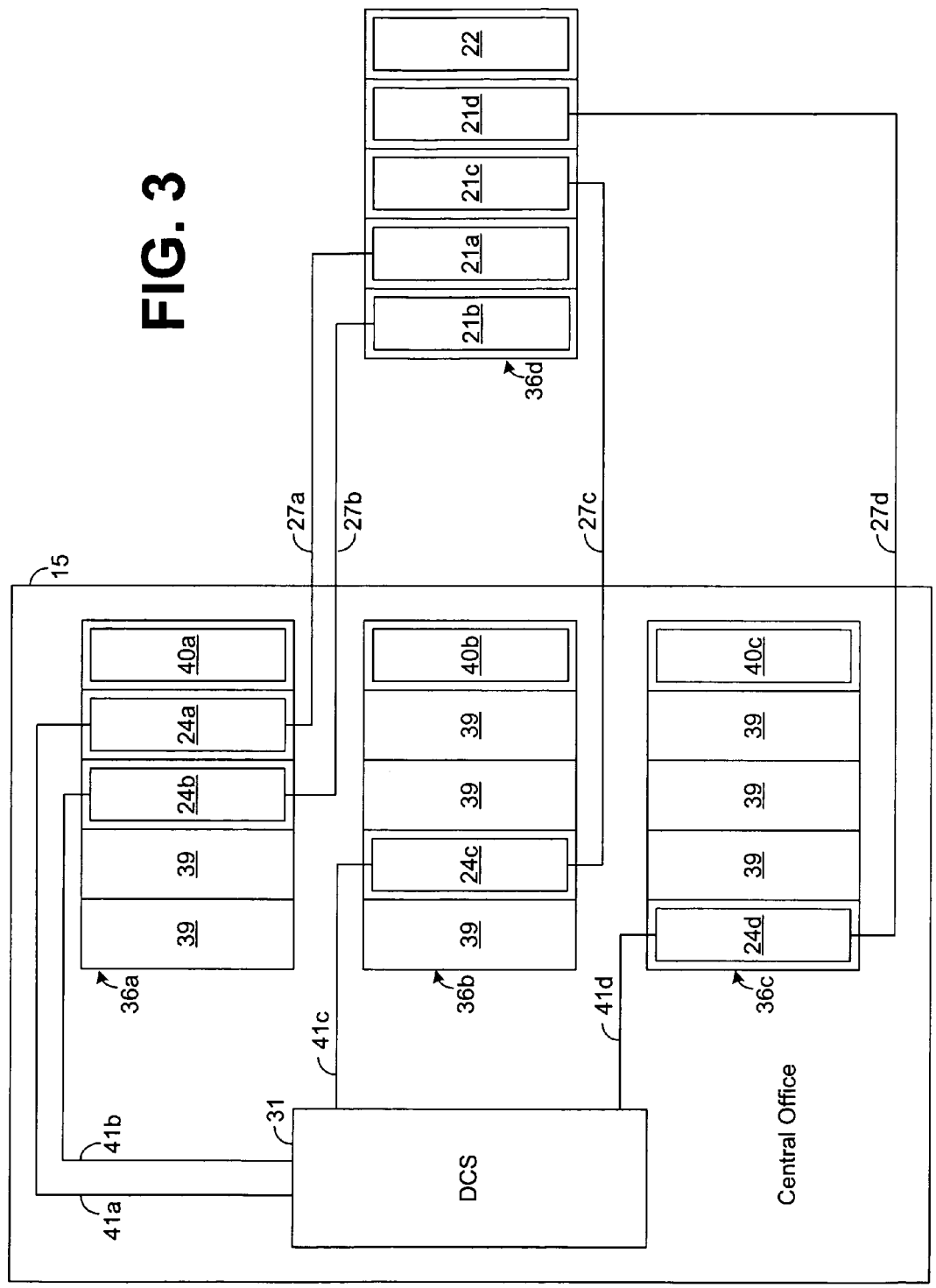
FIG. 3 is a block diagram illustrating a central office depicted in FIG. 1 once transceivers for communicating with the backup control unit are mounted in the chassises residing at the central office.

FIG. 3 depicts the central office 15, as well as the remote transceivers 21a-21c and BCU 22 residing at the customer premises 12 (FIG. 1), once each of the transceivers 24a-24d is installed in the chassises 36a-36c. Note that transceivers 24c and 24d are located in different chassises 36a-36c with respect to each other and with respect to transceivers 24a and 24b. Each of the transceivers 24a-24d may be inserted into any of the chassises 36a-36c such that any combination of the transceivers 24a-24d may be housed by any of the chassises 36a-36c.

Furthermore, each chassis 36a-36c preferably comprises a controller card 40a-40c for monitoring and controlling the transceivers mounted within it. As an example, controller card 40a is mounted in chassis 36a, and this card 40a monitors and controls each transceiver mounted in the chassis 36a. Each of the chassises 36a-36c comprises a backplane (not shown) providing connectivity between the respective controller card 40a-40c mounted in the chassis 36a-36c and each transceiver mounted in the same chassis 36a-36c. The architecture and functionality of each controller card 40a-40c may be identical to other controller cards implemented in conventional systems, and the design of the controller cards 40a-40c is not an important consideration for the present invention.

As shown by FIG. 3, central office transceiver 24a is coupled to the DCS 31 and remote transceiver 21a via connection 41a and subscriber line 27a, respectively, and central office transceiver 24b is coupled to the DCS 31 and remote transceiver 21b via connection 41b and subscriber line 27b, respectively. Further, central office transceiver 24c is coupled to the DCS 31 and remote transceiver 21c via connection 41c and subscriber line 27c, respectively, and central office transceiver 24d is coupled to the DCS 31 and remote transceiver 21d via connection 41d and subscriber line 27d, respectively.

As shown by FIG. 3, each of the remote transceivers 21a-21d may be inserted into a respective slot of a chassis 36d located at the customer premises 12 (FIG. 1). Furthermore, the BCU 22 may also be inserted into a slot of the chassis 36d. However, it should be noted that the remote transceivers 21a-21d and the BCU 22 may be differently situated at the customer premises 12 in other embodiments. For example, in another embodiment, the chassis 36d may comprise an adapter (not shown) external to the slots of the chassis 36d and to which the BCU 22 plugs into. Various other configurations are possible in yet other embodiments.

In the embodiment shown by FIG. 3, a backplane (not shown) of the chassis 36d preferably provides connectivity between the remote transceivers 21a-21d and the BCU 22. Indeed, the configuration of the chassis 36d may be similar or identical to known or future-developed chassises. U.S. Pat. No. 5,546,282, entitled "Telecommunication Network Digital Cross-Connect Panels having Insertable Modules with Printed Circuit Board Mounted Coaxial Jack Switches," which is incorporated herein by reference, generally describes various chassises for use within a telecommunication system. The chassis described by the foregoing patent may be used to implement any of the chassises 36a-36d.

Figure 4:
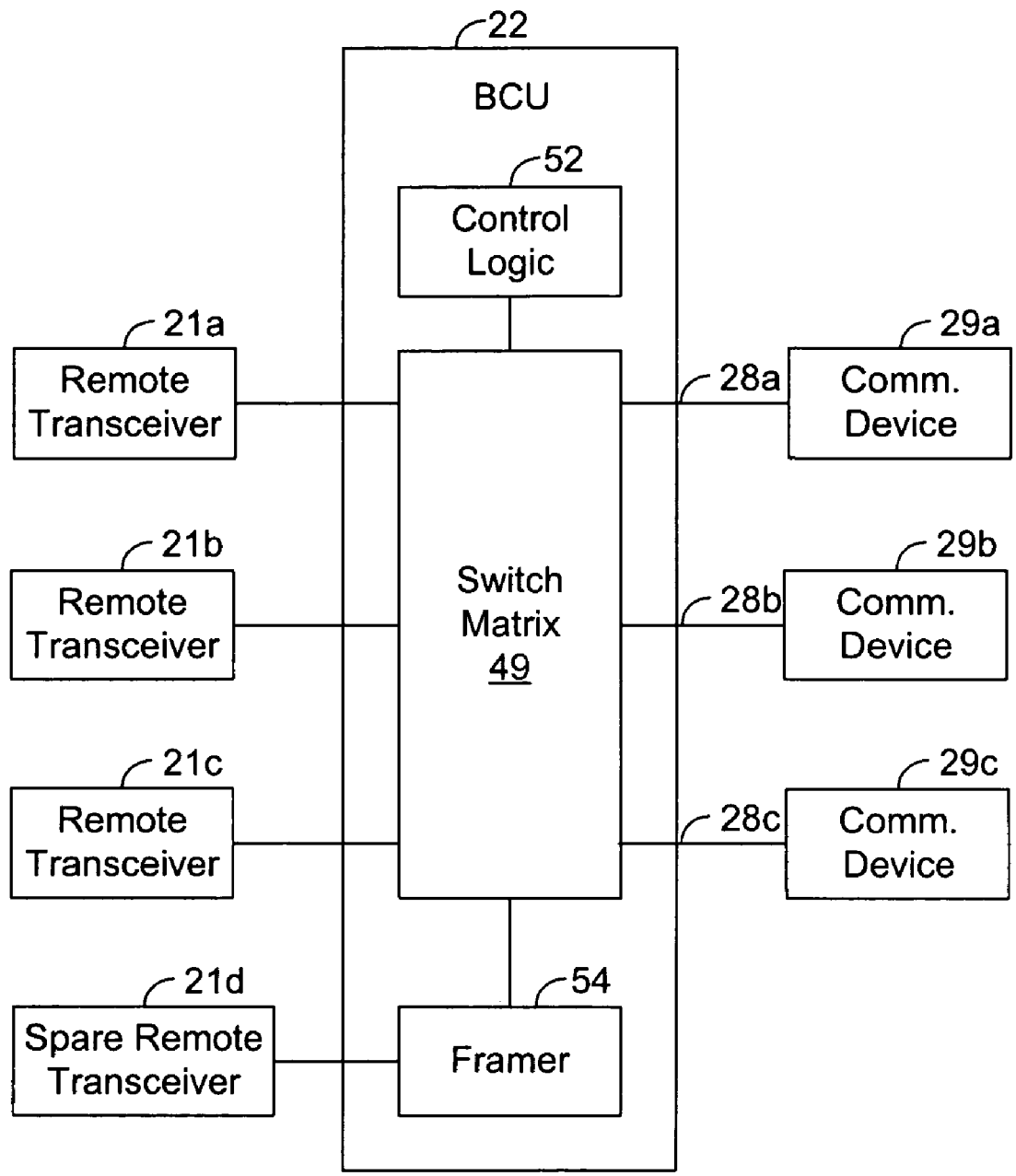
FIG. 4 is a block diagram illustrating a backup control unit depicted in FIG. 1.

As shown by FIG. 4, the BCU 22 comprises a switch matrix 49, which selectively couples the remote transceivers 21a-21d to the communication connections 28a-28c and, therefore, communication devices 29a-29c based on control signals from control logic 52. Note that the control logic 52 may be implemented in software, hardware, or any combination thereof. The BCU 22 also comprises a framer 54, which is configured to enable control and status information to be communicated between the central office 15 and the customer premises 12.

In this regard, the backup subscriber line 27d preferably defines a management link and a communication link. The framer 54 terminates the management link and communicates the aforementioned control and status information. The communication link, on the other hand, is used to backup one of the primary subscriber lines 27a-27c. Initially, it is not necessary for the communication link of the subscriber line 27d to be terminated. However, when the communication link is used to backup communication for a corrupted subscriber line 27a-27c, the communication link is terminated by the spare remote transceiver 21d thereby enabling this transceiver 21d to communicate with the spare transceiver 24d over the communication link of the backup subscriber line 27d. Techniques for using the communication link to backup one of the primary subscriber lines 27a-27c will be described in more detail hereafter.

Figure 5:
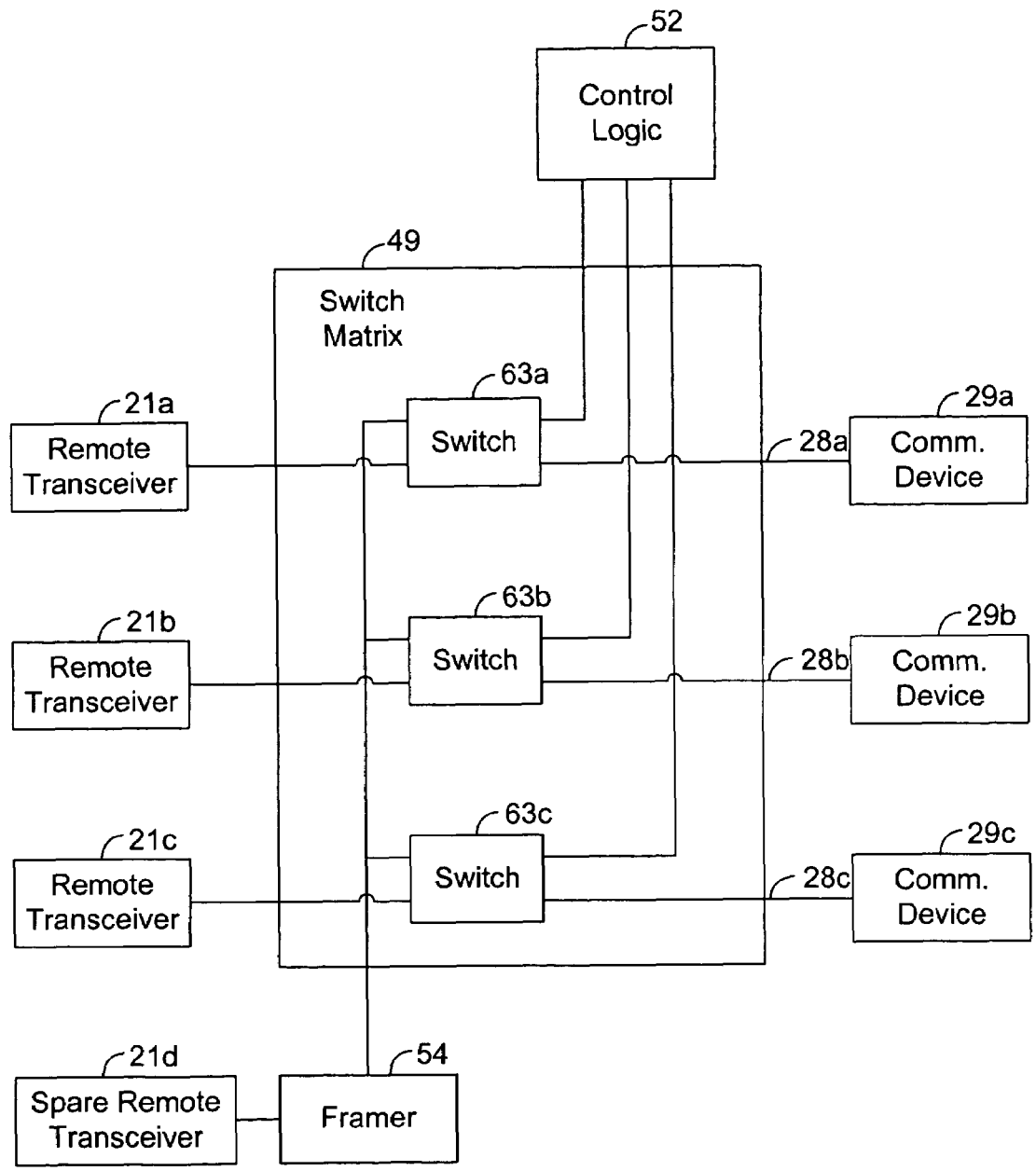
FIG. 5 is a block diagram illustrating a switch matrix depicted in FIG. 4.

As shown by FIG. 5, the switch matrix 49 comprises a plurality of switches 63a-63c. Each switch 63a-63c is coupled to a respective one of the remote transceivers 21a-21c and to a respective one of the communication connections 28a-28c. Each switch 63a-63c is also coupled to the control logic 52 and to the spare remote transceiver 21d through the framer 54. Initially, each switch 63a-63c is configured to conductively couple its respective remote transceiver 21a-21c to its respective communication connection 28a-28c. Thus, switch 63a conductively couples remote transceiver 21a to communication connection 28a. Further, switch 63b conductively couples remote transceiver 21b to communication connection 28b, and switch 63c conductively couples remote transceiver 21c to communication connection 28c.

The control logic 52 monitors the communication passing through switches 63a-63c (i.e., occurring between the customer premises 12 and the central office 15). If desired, the control logic 52 may be in communication with the remote transceivers 21a-21d for the purpose of the monitoring the communication being conducted by these transceivers 21a-

21*d*. If the control logic 52 detects an error condition (e.g., a communication failure) that significantly degrades the communication occurring across one of the subscriber lines 27*a*-27*c*, referred to hereafter as the "corrupted subscriber line," the control logic 52 initiates a backup switch or, in other words, switches communication from the corrupted subscriber line 27*a*-27*c* to the backup subscriber line 27*d*.

Note that there are various methodologies that may be employed by the control logic 52 to detect an error condition. For example, the control logic 52 may determine a data rate associated with one of the subscriber lines 27*a*-27*c*, and detect an error condition when this rate falls below a predefined threshold. In another example, the control logic 52 may determine an error rate associated with one of the subscriber lines 27*a*-27*c* and detect an error condition when this rate exceeds a predefined threshold. Various other techniques for detecting an error condition may be employed without departing from the principles of the present invention.

To initiate a backup switch, the control logic 52 transmits, to the switch 63*a*-63*c* corresponding with the transceiver 21*a*-21*c* that is coupled to the corrupted subscriber line 27*a*-27*c*, a control signal that causes this switch 63*a*-63*c* to change states. In particular, the foregoing switch 63*a*-63*c* electrically isolates the foregoing transceiver 21*a*-21*c* from the communication device 29*a*-29*c* that was previously communicating over the corrupted subscriber line 27*a*-27*c*, and the switch 63*a*-63*c* conductively couples the foregoing communication device 29*a*-29*c* to the spare remote transceiver 21*d*. If the spare remote transceiver 21*d* is not terminating the communication link of the backup subscriber line 27*d*, then the control logic 52 informs the spare remote transceiver 21*d* of the backup switch. In response, the spare remote transceiver 21*d* changes its state such that it terminates the backup subscriber line 21*d* and prepares itself for communication with the spare transceiver 24*d* at the central office 15 (FIG. 1). As a result, the spare remote transceiver 21*d* is able to communicate with the spare transceiver 24*d* of the central office 15 via the communication link of the backup subscriber line 27*d*.

The control logic 52 also transmits a switch notification to the spare transceiver 24*d* over the management link of the backup subscriber line 27*d*. Note that the spare transceiver 24*d* may comprise or be in communication with a framer (not shown) for receiving the switch notification from the backup subscriber line 27*d*. The switch notification preferably identifies the corrupted subscriber line 27*a*-27*c* and/or the central office transceiver 24*a*-24*c* that is communicating over the corrupted subscriber line 27*a*-27*c*. In response to the switch notification, the spare transceiver 24*d* terminates the backup subscriber line 27*d*, if this line 27*d* is not already terminated by the spare transceiver 24*d*, and prepares for communication with the spare remote transceiver 21*d*.

Also in response to the switch notification, the spare transceiver 24*d* informs the DCS 31 that data to be routed over the corrupted subscriber line 27*a*-27*c* is to be routed to the spare transceiver 24*d* instead. In response, the DCS 31 routes all such data to the spare transceiver 24*d*, which communicates this data to the spare remote transceiver 21*d* that is now terminating the backup subscriber line 27*d*. Furthermore, any data received by the BCU 22 from the communication connection 28*a*-28*c* originally coupled to the transceiver 21*a*-21*c* of the corrupted subscriber line is transmitted, by the switch matrix 49 to the spare remote transceiver 21*d*, which communicates such data to the spare central office transceiver 24*d*. This data is then communicated to the DCS 31, which routes the data to the appropriate network component (not shown).

Thus, communication originally occurring across the corrupted subscriber line 27*a*-27*c* is switched to the backup subscriber line 27*d*.

Note that the switchover at the DCS 31 may be automatic or manual. In this regard, the DCS 31 may be configured to automatically route, in response to signalling from the spare transceiver 24*d*, data to the spare transceiver 24*d* in lieu of the transceiver 24*a*-24*c* coupled to the corrupted subscriber line 27*a*-27*c*. However, in another embodiment, the switch notification received from BCU 22 may be communicated to a user. In response to the switch notification, the user may manually reconfigure the DCS 31 such that it routes data to the spare transceiver 24*d* in lieu of the transceiver 24*a*-24*c* coupled to the corrupted subscriber line 27*a*-27*c*. Indeed, various techniques for effectuating the switchover at the DCS 31 are possible.

It should be noted that the aforedescribed techniques for using the backup subscriber line 27*d* to backup data communication between the central office 15 and the customer premises 12 may be performed for any one of the primary subscriber lines 27*a*-27*c*. Thus, the spare transceiver 24*d* may be used to backup the communication of any one of the central office transceivers 24*a*-24*c* regardless of which chassis 36*a*-36*c* is housing which transceiver 24*a*-24*c*. Therefore, it is not necessary for a network service provider to ensure that each central office transceiver 24*a*-24*c* protected by the same spare transceiver 24*d* is housed by the same chassis 36*a*-36*c*.

Moreover, if a new central office transceiver (not shown) is to be added to service the customer premises 12, the new central office transceiver may be inserted into any one of the chassises 36*a*-36*c*, and the same spare transceiver 24*d* may be used to backup the new central office transceiver. The foregoing may be achieved without reconfiguring the existing transceivers 24*a*-24*d* or the connections that connect the existing transceivers 24*a*-24*d* to either the DCS 31 or the subscriber lines 27*a*-27*d*.

An exemplary operation of protecting communication between the central office 15 and customer premises 12 will now be described below.

Assume that a network service provider initially inserts, into two different slots 39 of chassis 36*a*, central office transceivers 24*a* and 24*b* to communicate with remote transceivers 21*a* and 21*b*, respectively. To backup up such communication, the network service provider may also insert, into a slot 39 of chassis 36*c*, a spare transceiver 24*d*, which protects communication between central office transceivers 24*a* and 24*b* and remote transceivers 21*a* and 21*b* according to the techniques described above.

Over time, the network service provider may insert central office transceivers (not shown) in the remaining slots 39 of the chassis 36*a*. Then, assume that a customer adds a new remote transceiver 21*c* at the customer premises 12 and requests an additional subscriber line 27*c* to service this new transceiver 21*c*. In response, the network service provider may insert central office transceiver 24*c* into a slot 39 of chassis 36*b* and connect subscriber line 27*c* to this transceiver 24*c*. The same spare transceiver 24*d* used to backup central office transceivers 24*a* and 24*b* may also be used to backup the newly installed transceiver 24*c*.

Figure 6:
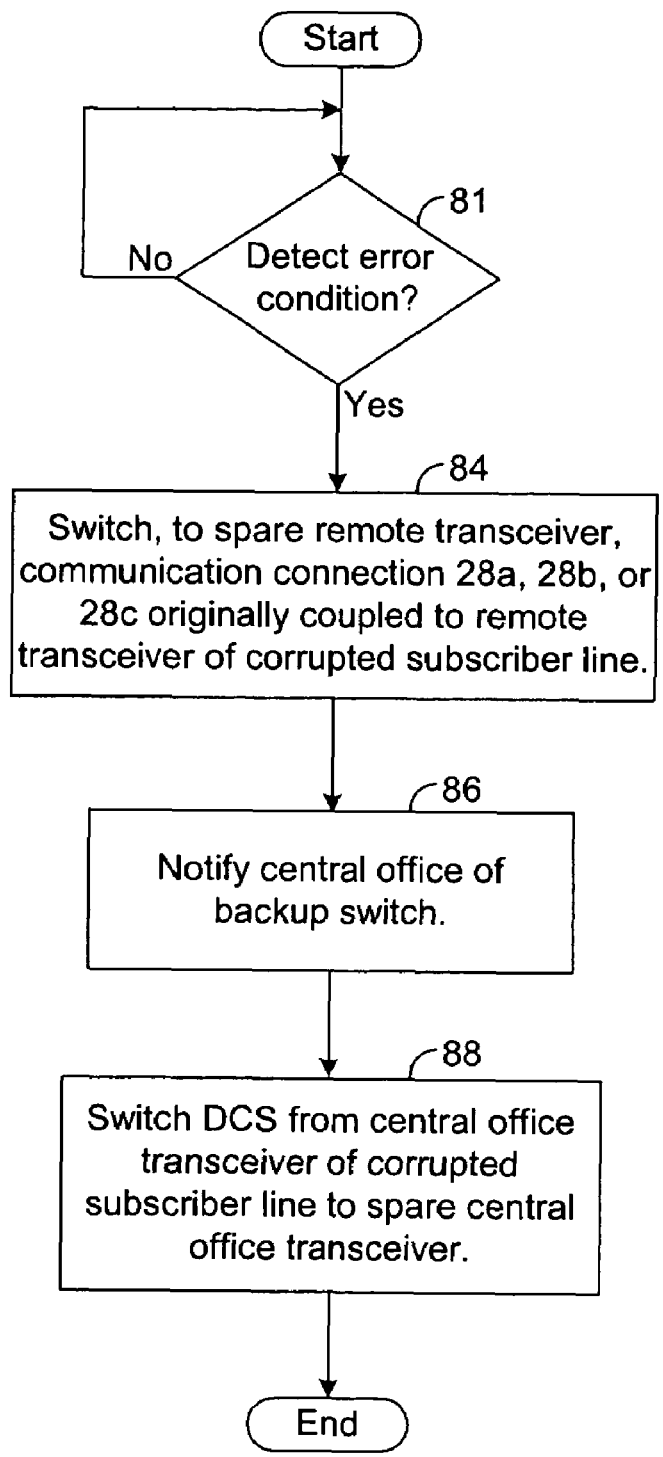
FIG. 6 is flow chart illustrating a process for protecting communication occurring across a subscriber line within the system depicted by FIG. 1.

In this regard, assume that the subscriber line 27*c* is accidentally severed while the newly installed transceiver 24*c* is communicating with remote transceiver 21*c*. Based on the resulting lack of communication between transceivers 21*c* and 24*c*, the control logic 52 detects an error condition associated with subscriber line 27*c* in block 81 of FIG. 6. In response to such a detection, the control logic 52 controls the switch matrix 49 such that the communication connection 28c originally coupled to remote transceiver 21c via the switch matrix 49 is now conductively coupled to spare remote transceiver 21d, as shown by block 84 of FIG. 6. If the spare remote transceiver is not already terminating backup subscriber line, the control logic 52 also causes the spare remote transceiver 21d to terminate the backup subscriber line 27d.

As shown by block 86, the control logic 52 also transmits a switch notification to spare transceiver 24d via the management link of the backup subscriber line 27d. This switch notification preferably identifies the failed subscriber loop 27c and/or the transceiver 24c coupled to the failed subscriber loop 27c. In response to the switch notification, the spare transceiver 24d terminates the backup subscriber line 27d, if the spare transceiver 24d is not already terminating this line 27d. Also in response to the switch notification, the spare transceiver 24d notifies, in block 88 of FIG. 6, the DCS 31 of the switch, thereby causing the DCS 31 to route, to the spare transceiver 24d in lieu of the central office transceiver 24c, data that would have otherwise been communicated to the remote transceiver 21c. Thereafter, data that would have previously been communicated over the primary subscriber line 27c is instead communicated via the backup subscriber line 27d and the spare transceivers 21d and 24d. Once the problem associated with primary subscriber line 27c is resolved, communication with the remote transceiver 21c may be switched back to central office transceiver 24c, if desired.

Now, therefore, the following is claimed:

1. A data communication system for communicating data between a central office and a customer premises that is remotely located from said central office, comprising:
   a first transceiver coupled to a first subscriber line extending from said central office to said customer premises, said first transceiver configured to communicate with a transceiver located at said central office;
   a second transceiver coupled to a second subscriber line extending from said central office to said customer premises; and
   control logic residing at said customer premises, said control logic configured to detect an error condition associated with communication between said first transceiver and said transceiver located at said central office, said control logic configured to transmit, in response to a detection of said error condition, a switch notification to said central office via said second transceiver and said second subscriber line, wherein at least one component at said central office is configured to route data over said second subscriber line in response to said switch notification, wherein a first chassis and a second chassis are located at said central office, wherein said transceiver located at said central office is mounted in said first chassis, and wherein a third transceiver mounted in said second chassis is configured to receive said switch notification and to backup said transceiver mounted in said first chassis based on said switch notification.

2. The system of claim 1, wherein said at least one component switches, in response to said switch notification, communication from said first subscriber line to said second subscriber line.

3. The system of claim 1, wherein data to be communicated over said first subscriber line is communicated, based on said switch notification, over said second subscriber line in lieu of said first subscriber line.

4. The system of claim 1, wherein said second subscriber line provides a management link and a communication link between said customer premises and said central office.

5. The system of claim 4, wherein said management link is terminated by a framer, and wherein said communication link is terminated by said second transceiver.

6. The system of claim 4, wherein said management link is terminated prior to said error condition, and wherein said second transceiver is configured to terminate said communication link in response to said switch notification.

7. The system of claim 6, wherein said management link is terminated by a framer prior to said error condition.

8. The system of claim 1, further comprising a switch coupled to a communication device and to said first and second transceivers, wherein said control logic is configured to change a state of said switch in response to said detection of said error condition.

9. The system of claim 8, wherein said control logic changes said state in response to said detection such that said first transceiver is electrically isolated from said communication device and such that said second transceiver is conductively coupled to said communication device.

10. The system of claim 9, wherein said at least one component is configured to route data destined for said communication device to said first transceiver prior to said error condition, said at least one component further configured to route data destined for said communication device to a third transceiver based on said switch notification, said third transceiver coupled to said second subscriber line and configured to communicate with said second transceiver.

11. A data communication system having a central office and a customer premises that is remotely located from said central office, comprising:
   a first transceiver coupled to a first subscriber line extending from said central office to said customer premises, said first transceiver configured to communicate, via said first subscriber line, with a transceiver located at said central office;
   a second transceiver coupled to a second subscriber line extending from said central office to said customer premises;
   a communication device in communication with said first transceiver; and
   control logic residing at said customer premises, said control logic configured to initiate, in response to a detection of an error condition, a backup switch such that said communication device communicates with said second transceiver in lieu of said first transceiver, said control logic further configured transmit information indicative of said backup switch to said central office, wherein data destined for said communication device is transmitted, based on said information, to said second transceiver via said second subscriber line in lieu of said first subscriber line, wherein a first chassis and a second chassis are located at said central office, wherein said transceiver located at said central office is mounted in said first chassis, and wherein a transceiver mounted in said second chassis is configured to receive said information and to backup said transceiver mounted in said first chassis in response to said information.

12. The system of claim 11, further comprising a switch coupled to said first transceiver, said second transceiver, and said communication device, said switch configured to conductively couple said first transceiver to said communication device prior to said backup switch, wherein said control logic is configured to change a state of said switch during said backup switch such that said switch conductively couples said communication device to said second transceiver.

13. The system of claim 11, wherein said second subscriber line provides a management link and a communication link, and wherein said management link is terminated by a framer and said communication link is terminated by said second transceiver.

14. The system of claim 13, wherein said second transceiver is configured to terminate said communication link in response to said backup switch initiated by said control logic.

15. A data communication system having a central office and a customer premises that is remotely located from said central office, comprising:

a chassis for holding a first customer premises transceiver and a second customer premises transceiver, said first customer premises transceiver coupled to a first central office transceiver via a first subscriber line extending from said central office to said customer premises, said second customer premises transceiver coupled to a second central office transceiver via a second subscriber line extending from said central office to said customer premises; and control logic mounted on said chassis, said control logic configured to initiate a backup switch in response to a detection, by said control logic, of an error condition associated with communication occurring over said first subscriber line, said control logic configured to switch said communication from said first subscriber line to said second subscriber line, wherein at least one component at said central office is responsive to said control logic for routing data to said second central office transceiver in lieu of said first central office transceiver, wherein said first central office transceiver is mounted in a first central office chassis, wherein said second central office transceiver is mounted in a second central office chassis, and wherein said second central office transceiver is responsive to said control logic for backing up said first central office transceiver.

16. The system of claim 15, wherein said second subscriber line provides a management link and a communication link, and wherein said management link is terminated by a framer and said communication link is terminated by said second customer premises transceiver in response to said backup switch initiated by said control logic.

17. The system of claim 15, further comprising a switch coupled to said first customer premises transceiver, said second customer premises transceiver, and a communication device residing at said customer premises, said switch configured to conductively couple said first customer premises transceiver to said communication device prior to said backup switch, wherein said control logic is configured to change a state of said switch during said backup switch such that said switch conductively couples said communication device to said second customer premises transceiver.

18. A method for communicating between a central office and a customer premises that is remotely located from said central office, comprising the steps of:

communicating between a first customer premises transceiver and a first central office transceiver via a first subscriber line extending from said central office to said customer premises, wherein said first central office transceiver is mounted in a first chassis;

detecting an error condition associated with said communicating step;

transmitting, in response to said error condition, a switch notification from a second customer premises transceiver to a second central office transceiver via a second subscriber line extending from said central office to said customer premises, wherein said second central office transceiver is mounted in a second chassis;

performing a backup switch in response to said switch notification such that a communication device previously communicating over said first subscriber line switches to communicating over said second subscriber line; and initiating communication between said second central office transceiver and said second customer premises transceiver in response to said switch notification.

19. The method of claim 18, wherein said performing step comprises the step of changing a state of a switch that is coupled to said first customer premises transceiver, said second customer premises transceiver, and said communication device.

20. The method of claim 18, further comprising the steps of:

establishing a management link over said second subscriber line;

communicating status and control information via said management link; and establishing a communication link over said second subscriber line in response to said switch notification.

21. The method of claim 20, further comprising the steps of:

terminating said management link via a framer residing at said customer premises; and terminating said communication link via said second customer premises transceiver.

* * * * *